United States Patent [19]

Smith

[11] 4,109,640

[45] Aug. 29, 1978

[54] SOLAR HEATING SYSTEM

[76] Inventor: Lynwood L. Smith, 2915 Pink Hill Rd., Kinston, N.C. 28501

[21] Appl. No.: 676,534

[22] Filed: Apr. 12, 1976

[51] Int. Cl.² ................................................ F24J 3/02
[52] U.S. Cl. ................................ 126/271; 248/183; 126/270; 237/1 A
[58] Field of Search ............... 126/270, 271; 237/1 A; 248/183, 371, 377; 240/61.05

[56] References Cited

U.S. PATENT DOCUMENTS

| 1,014,972 | 1/1912 | Nichols | 126/271 |
| 1,338,644 | 4/1920 | Arthur et al. | 237/1 A |
| 1,855,815 | 4/1932 | Abbot | 126/271 |
| 2,182,222 | 12/1939 | Courtis et al. | 126/270 |
| 2,247,830 | 7/1941 | Abbot | 126/271 |
| 2,383,234 | 8/1945 | Barnes | 126/271 |
| 2,933,885 | 4/1960 | Benedek et al. | 237/1 A |
| 3,059,889 | 10/1962 | Pottmeyer | 248/183 |
| 3,106,201 | 10/1963 | Steinberg | 127/270 |
| 3,894,528 | 7/1975 | Stubblefield | 237/1 A X |
| 3,974,822 | 8/1976 | Patil | 126/271 |
| 4,013,062 | 3/1977 | Laird | 126/271 |

Primary Examiner—William F. O'Dea
Assistant Examiner—Larry Jones
Attorney, Agent, or Firm—Mills & Coats

[57] ABSTRACT

In abstract, a preferred embodiment of this invention is a system for heating a structure by capturing ambient solar energy and storing the same for controlled use thereafter. The collector portion of the present invention has a single and yet highly efficient motivating means to maintain the same at optimum angle to the solar radiant heat source.

8 Claims, 7 Drawing Figures

SOLAR HEATING SYSTEM

In the past, various systems have been devised in an effort to obtain a relatively inexpensive energy source for heating of enclosed building structures, hot water for various uses, and the like. Most of these systems have been plagued with either complete unreliability, with unacceptable fluctuations in available temperatures or such gross inefficiency as to not be able to justify the initial capital outlay for construction of the same.

Additionally, various systems and components thereof attempting to capture a maximum amount of energy from solar sources have been disclosed. These systems, however, have not been highly efficient in operation for the simpler devices and the more complex systems, although having more efficiency, are economically unpractical because of their complexity and cost. Also, maintenance and adjustments become extremely critical in the more complex systems which further detract from their economical operation and thus wide spread acceptance.

Further, solar heat use integrated into present conventional heating systems has not been shown to be practical or satisfactory.

After much research and study into the above mentioned problems, the present invention has been developed to provide a highly efficient solar energy collecting device which functions at peak efficiency throughout the day and automatically recycles during normal sundown periods to be in proper position for the next operative cycle. The system of the present invention also provides for a constant heat source over an extended period of time whether heat is being transferred into the system during that period or not. Additionally, the system of the present invention provides for a relatively constant temperature heat source so that the enclosure being heated will remain at a constant predetermined temperature in a manner similar to conventional heating systems.

When using the present solar heat exchanger system in combination with standard oil furnace or electric heated homes, a complete system is provided which gives 24 hour comfort with a minimum of fuel cost outlay to accomplish this. Thus, ti can be seen that a complete system is provided and not just desirable components with installation and systematizing being left to the prospective purchaser.

In view of the above, it is an object of the present invention to provide a highly efficient system for collecting and storing solar energy for use in heating enclosures and other desirable uses.

Another object of the present invention is to provide a solar heating system which is thermostatically controlled for even temperature over extended periods of time.

Another object of the present invention is to provide, in a solar energy collecting system, a simple, inexpensive and yet highly efficient means for obtaining maximum exposure to solar radiation during the hours of availability of the same.

Another object of the present invention is to provide a solar collecting and heating system which is readily installable in any area where direct rays of the sun fall for a substantial part of the day.

A further object of the present invention is to provide a solar heating system which is relatively inexpensive to construct and install and yet is highly efficient and extremely economical in operation.

Other objects and advantages of the present invention will become apparent and obvious from a study of the following description and the accompanying drawings which are merely illustrative of such invention.

IN THE DRAWINGS

Figure 1:
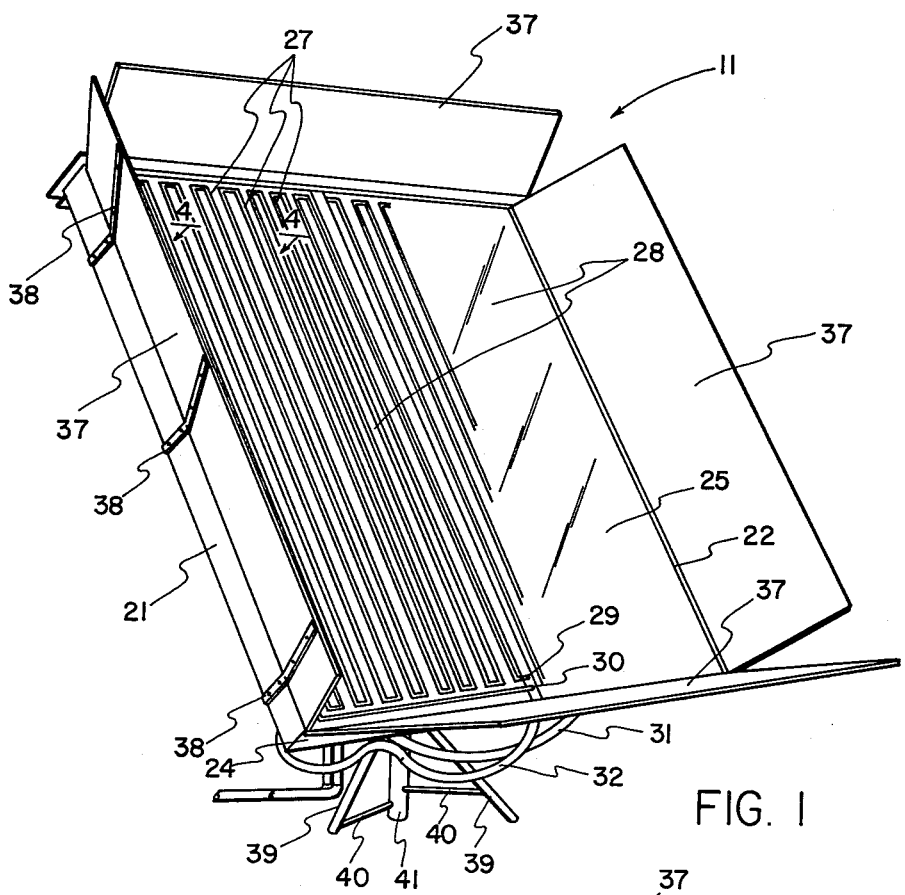
FIG. 1 is a front perspective view of the solar energy collector and exchanger of the present invention.

With further reference to the drawings, the temperature controlled system of the present invention, indicated generally at 10, is composed of a heat exchanger unit 11, a heat storage means 12 and an enclosure or other means 13 to be temperature controlled. When incorporated into the system of the present invention, these last three mentioned portions of the system are interconnected and controlled as will hereinafter be set forth in more detail.

Referring more specifically to the heat exchanger unit of the present invention, a support means comprising a pair of generally parallely disposed longitudinal frame members 14 and 15 have fixedly secured laterally across the ends thereof frame members 16 and 17. A backing surface 18 composed of plywood, sheet metal or the like is provided. Interiorly of backing surface 18 is an insulating material 19 to prevent excessive heat loss. A layer of foil material 20 is provided on the opposite side of insulation 19 from backing 18.

Pairs of sides 21 and 22 and ends 23 and 24 are provided which are fixedly secured to the frame members heretofore mentioned and the backing 18 to provide a box-like structure. A transparent heat retaining surface 25 such as clear pastic, glass or the like is provided across the portion of the box-like structure hereinabove defined opposite backing surface 18.

Figure 4:
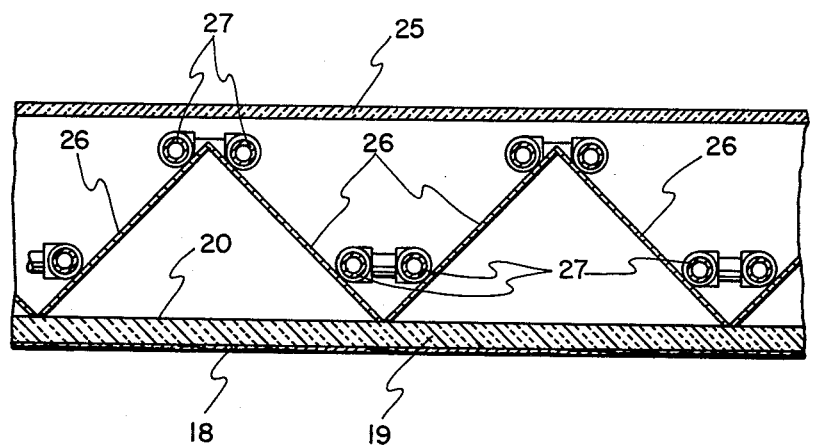
FIG. 4 is a partial sectional view taken through lines 4—4 of FIG. 1.

Extending from the area adjacent foil surface 20, toward transparent surface 25, are a plurality of elongated, ridge-like heat exchanger surfaces 26 as can clearly be seen in the FIGS., particularly FIG. 4. Each of the surfaces 26 is preferably composed of sheet metal and can be secured to the heat exchanger 11 along ends 23 and 24.

Heat exchange tubes 27 are provided between transparent surface 25 and heat exchange surfaces 26 as can clearly be seen in FIGS. 1 and 4. These heat exchange tubes are preferably U-shaped in a zig-zag pattern adjacent the heat exchange surface 26 so that two portions of the tube lie adjacent each peak of surfaces 26 and two portions of such tube lie adjacent each valley as can clearly be seen in FIG. 4. Tube 27 can either be a continuous tube bent to the configuration described and shown or can be a plurality of elongated tubes with U-shaped or manifold end portions. Whichever form is used would be left to the convenience of the manufacturer, considering cost and manfacturing time economics.

All surfaces, including the heat exchange tubes 27 and the heat exchange surfaces 26, that can be viewed through transparent window 25 are preferably painted with a heat absorbing paint such as flat black.

For manufacturing purposes, the heat exchange surfaces 26, heat exchange tubes 27 and the transparent surfaces 25 can be constructed as a panel unit of convenient handling size such as 4 by 8 feet and the box-like enclosure defined by backing surface 18, sides 21 and 22 and ends 23 and 24 can be made of such a size to accommodate either one panel, two panels, three panels, and so forth. In constructing the readily handable panels, indicated generally at 28, structural support means would, of course, be provided but these are felt to be well known to those skilled in the art and further description of the same is not deemed necessary.

Each of the solar panels 28 has an inlet portion 29 to tube or conduit 27 and an outlet portion 30. The inlet portion of each of the panels is operatively connected to an inlet line 31. Each of the outlet portions of each solar panel is operatively secured to an outlet line 32. As shown in the drawings, both the inlet and outlet lines are preferably insulated to prevent undesirable heat loss during flow of a heated fluid therethrough.

Inlet line 31 is operatively secured to a standard valve means 33 and outlet line 34 is operatively secured to a similar valve means 34. Exchanger unit inlet line 35 is connectingly secured to valve 33 and exchanger unit outlet line 36 is connectingly attached to valve 34.

The reason for the inlet and outlet lines passing through valve means 33 and 34, respectively, is so the exchanger unit 11 and the exchanger tubes 27 therein can be precharged with a fluid such as water, antifreeze, or other heat transfer media which will eliminate the problem of air in the lines of the system when installed. The advantage of this will hereinafter become more obvious.

To further aid in the absorption of solar energy, a plurality of reflector panels 37 are provided which are fixedly secured to sides 21 and 22 as well as ends 23 and 24. These reflector panels are, for the size solar panels hereinabove described, preferably approximately 18 inches in width and 8 feet in length. Each reflector has been found to operate at optimum when disposed at an angle of approximately 20° outwardly from their respective side or end. Each of these reflectors is preferably either white or silver colored to reflect maximum rays into the blackened surfaces of the heat exchanger 11. Brackets 38 are provided, as seen clearly in FIGS. 1 and 2, to secure the reflector panels 37 to the respective sides and ends of the exchanger unit 11.

To support, move and properly orientate exchanger unit 11, a tripod-shaped support stand comprising legs 39, braces 40 and central support shaft 41 are provided. Rotatively mounted on shaft 41 is a support sleeve 42. Fixedly secured to this support sleeve is a spur gear 43. To protect this gear from the elements, a housing 44 is provided thereabout. Fixedly secured to and mounted on one of the support legs 39 is a source of rotative power such as electric motor 45. This motor is operatively secured to gear box 46. This gear box, as well as motor 45, are of standard construction, are readily available on the market, and further discussion and details of the same are not deemed necessary.

The power output shaft 47 of gear box 46 has gear 48 fixedly secured thereto. Gear 48 is designed for meshing engagement with gear 43.

Support sleeve 42 has a unit support shaft 49 fixedly secured thereto and terminating at its upper end (as oriented in the drawings) at a semi-cylindrical sleeve 50 which is fixedly secured thereto. A second semi-cylindrical sleeve 51 is provided. Each of these two last mentioned sleeves have outwardly projecting flanges 52 and 53 which lie juxtaposed to each other and are held in releasably secured relation by means such as bolts 54. The reason for this arrangement is to allow the heat exchanger unit 11 to be shipped separate from its support means and then secured thereto on location.

Figure 2:
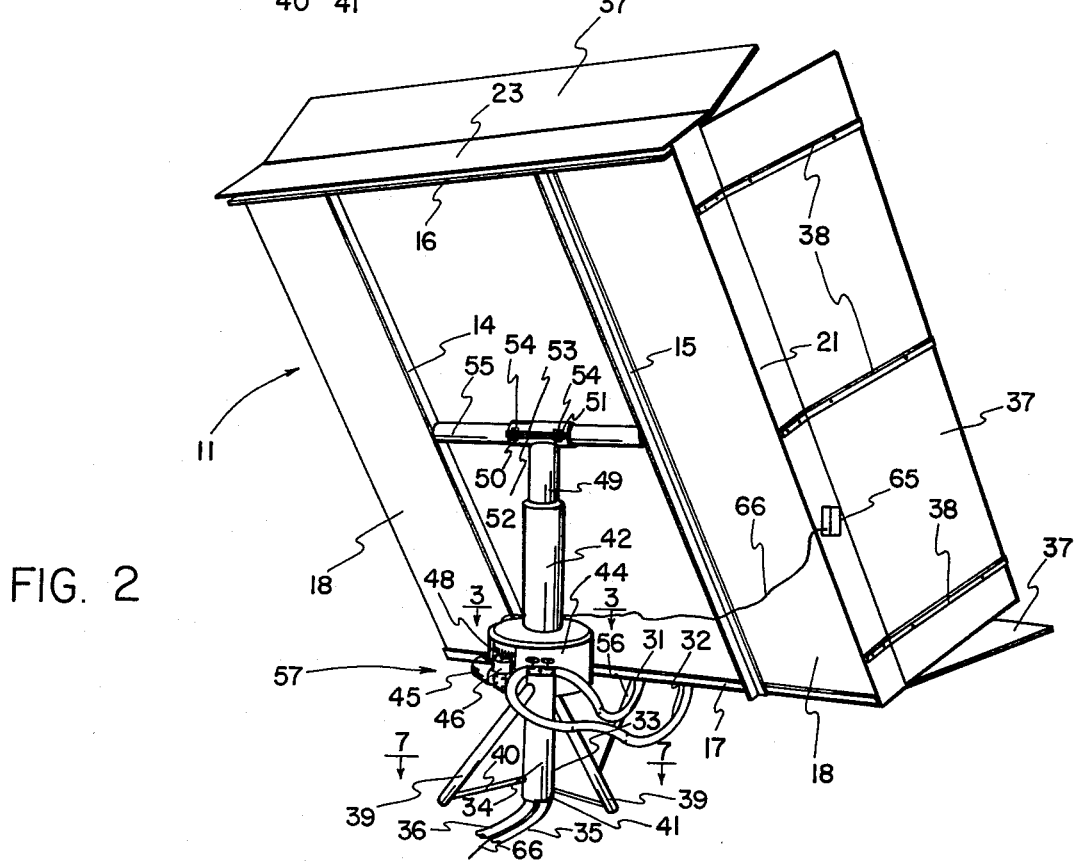
FIG. 2 is a rear perspective view of the same.
Figure 3:
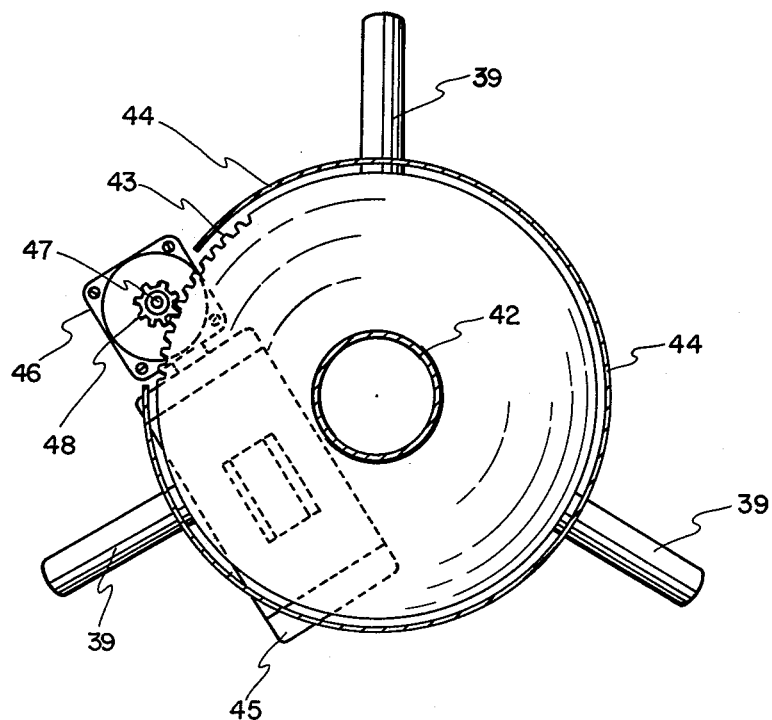
FIG. 3 is a sectional view taken through lines 3—3 of FIG. 2.

Rotatively mounted between the two adjacent semi-cylindrical sleeves 50 and 51 is a cross support shaft 55 which is fixedly secured at its ends to longitudinal frame members 14 and 15 as can clearly be seen in FIG. 2. Thus from the above it can be seen that the heat exchanger unit 11 can be tilted about the axis of cross support shaft 55 and can be rotated about the axis of unit support shaft 49.

A spacer or tilt support 56 is provided which is toggly connected at one end to lateral frame 17 and at the other end to one of the support legs 39 as can clearly be seen in FIG. 2. This tilt support is preferably longitudinally adjustable so that the distance between leg 39 and frame 17 can be varied. Any one of a number of well known means for accomplishing this such as telescoping rods, helically threaded shafts and sleeves or the like can be used.

The tripod legs 39 and support shaft 41 of the exchanger unit support indicated generally at 57 can, if desired, be embedded in the ground in concrete to stablize the same. With this type of installation, it has been found that the exchanger of the present invention can withstand gale force winds of 60 or more miles per hour without damage or misalignment.

Mounted within housing 44 (or at some other convenient location) is a timer switch 59 such as the AMF Paragon 25000 series program time switch. This timer can be set to one minute increments so that current can be allowed to pass therethrough for a very short interval with a predetermined opening of short or day interval.

Electrical current from a power source (not shown) passes through line 58 into programmable timer 59. Line 60 connects to motor 61 with a return line 62 to the above-mentioned power source. Thus it can be seen that through use of the sophisticated program time switch 59, motor 61 can be alternatively energized and deenergized to slowly, through gear box 46 and spur gear 43, rotate the heat exchanger unit 11 about the axis of shaft 49. When the timer is properly set, the said exchanger unit can follow the movement of the sun from early morning to late evening for maximum direct exposure.

Figure 7:
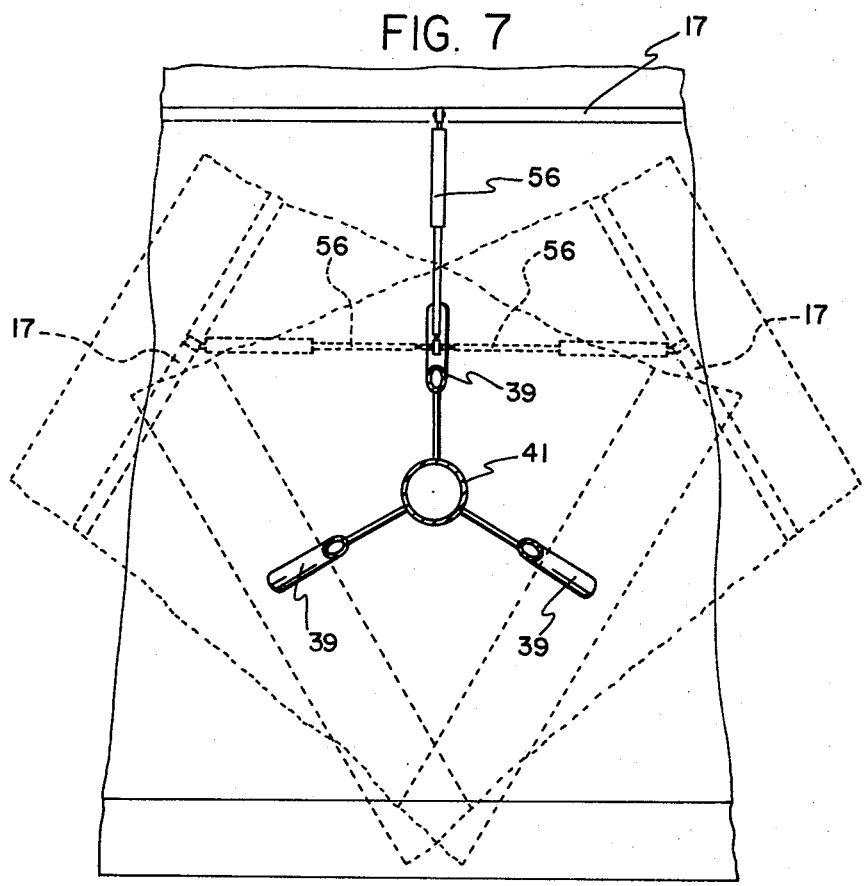
FIG. 7 is a sectional view taken through lines 7—7 of FIG. 2.

Because the tilt support 56 is togglely mounted to a single support leg 39 and off center from the axis of the shaft 49, the tilt of the heat exchanger unit 11 is maximum when said leg is in perpendicular alignment with frame 17 and is at a lesser angle of tilt when on either side of perpendicular as seen particularly clear in FIG. 7.

Figure 5:
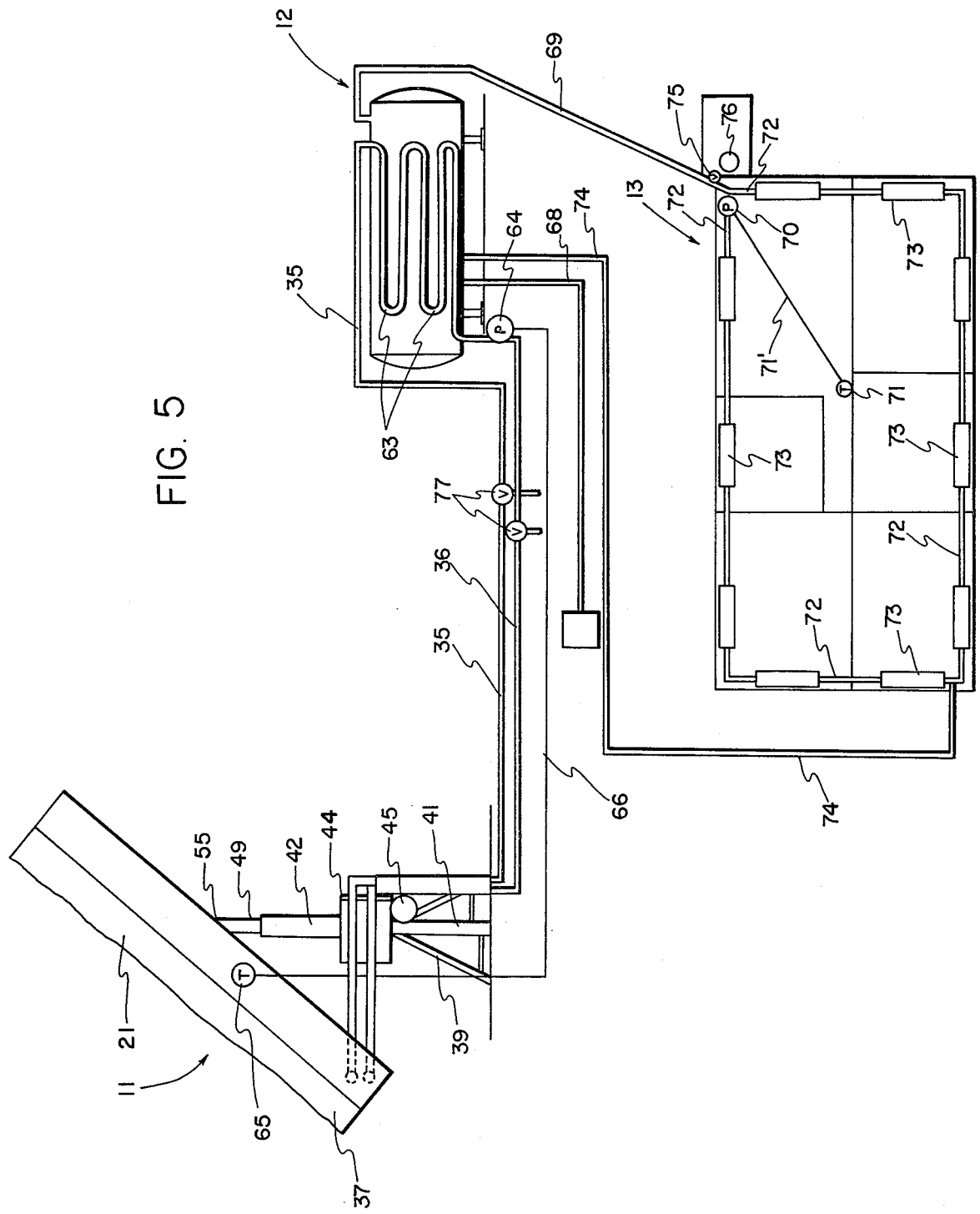
FIG. 5 is a schematic of the overall system of the present invention.
Figure 6:
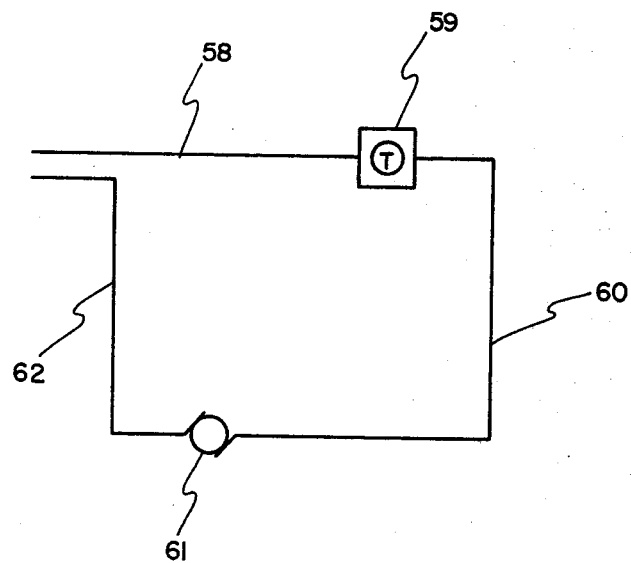
FIG. 6 is an electrical schematic of the collector-exchanger rotating drive.

Referring more specifically to FIG. 5, the insulated heat exchanger unit inlet and outlet lines 35 and 36 lead into and from a storage means 12. This storage means, although it could be in other forms, is preferably a tank of 250 gallon capacity or greater and is heavily insulated preferably with at least 6 inches of foam type insulation to allow only negligible undesired heat loss therefrom. Inside the tank is preferably a plurality of heat exchange coils 63 operatively connected between the inlet and outlet lines 35 and 36 although it is, of course, understood that a liquid such as water within the tank could be circulated through the inlet and outlet lines and the heat exchanger unit. This has been found, however, to be inferior to the use of the heat exchange coils in the storage means.

The reason the heat exchange coils are of superior benefit is that antifreeze can be used in the enclosed system of the tank coils 63, lines 35 and 36 and the exchanger tubes 27 with a requirement of only a few gallons of fluid while, if the liquid within the tank were circulated through the heat exchanger, several hundred gallons would be required. Also, the danger of freezing up during winter months of the relatively exposed tubes 27 of the heat exchanger during periods of darkness or heavy cloudiness requires supplemental heat from sources such as electric heaters which consume tremendous quantities of energy. By using the antifreeze charged coil system, the danger of fluid freeze up is eliminated.

Another benefit of the anifreeze charged coil system is the heat exchanger unit 11 can be precharged as can lines 35 and 36 and coils 63 so that when the system of the present invention is placed on job site, all that is requires is for seals to be broken and connection made to have a completely enclosed fluid charged system ready for operation.

A low energy consuming circulation pump 64 is disclosed in one of the lines 35 and 36. This pump is preferably thermostatically controlled and is connected to thermostat 65 by line 66. The thermostat, which as noted from the drawings is located on the heat exchanger 11, is of the type that makes on rising temperature and breaks on falling temperature. It has been found through use that a setting of 150° in winter and 165° in summer is adequate. Thus in the winter for example, when the temperature within the heat exchanger unit 11 rises to 150° or above, thermostat 65 will energize circulation pump 64 to circulate fluid through the heat exchanger 11 and back through the heat storage means 12. As long as the temperature within the heat exchanger 11 remains above the present 150°, the circulation pump will continue to operate. When the temperature drops below 150°, as on heavily clouded or darkening conditions, the thermostat 65 will break thus cutting off the circulation from pump 64.

Water from a well pump, a City water main or other water source 67 is preferably under approximately 40 psi pressure when it passes through water line 68 and into the heat storage means or tank 12. Once the tank 12 is completely filled, additional ambient water from source 67 will only be introduced as needed to keep the tank full. The primary depletion of the water will be from the water heater as will hereinafter be described.

A water outlet line 67 leads from tank 12 to a low energy consuming circulation pump 70, preferably of approximately 1/12 horsepower (as is pump 64). This pump is controlled by thermostat 71 which makes on temperature drop and breaks on rise as is the case with common household and building heat control thermostats. The circulation pump 70 is operatively connected to lines 72 which have space periodically hot water heat registers 73 of any common well known design. Lines 72 terminate at a juncture with water return line 74. This line circulates the somewhat cooled water in lines 72 back into tank 12 as seen clearly in FIG. 5. Thus it can be seen that as the temperature within the building or enclosure 13 drops below the present temperature on thermostat 71, circulation pump 70 will begin operating and circulate water through lines 72 and registers 73 and by line 74 back to heat storage tank 12 until the temperature within the enclosure rises enough for thermostat 71 to cut circulation pump 70 off.

A valve means 75 can be provided in outlet lines 69 of tank 12 so that water can be fed from such line directly into the inlet side of a standard electric or gas water heater 76. As water is removed from the water heater in the usual manner by the hot water faucet (not shown) of the plumbing system (not shown) of the enclosure or building 13, additional heated water from tank 12 will, under pressure, replace the water drawn off. So long as the water within the storage tank 12 is at or above the temperature set on the water heater, no current or energy will be consumed even though hot water is being withdrawn through the heater. Whenever the temperature of the water in the heat storage tank 12 drops below that set on the thermostat (not shown) of the water heater, its standard heating system will be activated in the normal manner. Even though the temperature of the storage tank 12 is not as high as that set for the water heater 76, the fact that the incoming water is at least partially preheated prior to entering hot water heater (rather than cold water coming directly from a well or outside water main) can amount over a period of time to a substantial savings in water heating energy.

To use the system of the present invention, the heat exchanger unit 11 is set up in proper orientation so that it can rotate from a direction facing the rising sun to a direction facing the setting sun with maximum tilt at the center or noon portion of these limits of travel. All motor and timer wiring as well as circulation pumps and thermostats are installed by the standard methods well known to those skilled in the art. All lines are charged with fluid as described and all tanks and lines leading to and from the same are filled and charged as the case may be. The system is now ready for operation.

With the solar panels 28 of the exchanger unit 11 facing toward the sun, the temperature in tubes 27 will rise above the preset temperature of thermostat 65 thus starting circulating pump 64. The fluid within the system will collect heat from tubes 27 of exchanger 11 and, through insulated line 36, carry the same into the heat storage means or tank 12. There heat will be exchanged through heat exchanger coil 63 to the medium such as water contained therein thus raising the temperature of such water while cooling the fluid within the coils. The cooled fluid will then circulate back to the exchanger unit 11 through insulation inlet line 35 and into exchanger tubes 27.

Timer 59 will periodically energize motor 61 to, through gears 48 and 43, rotate exchanger 11 in a time sequence to keep it pointing generally towards the sun for maximum energy absorption throughout the day. As earlier explained, the tilt support 56, because it is toggle connected off center from the axis of shaft 41, will cause a cyclic tilting back and forth of the exchanger 11 as it rotates about the axis of its shaft during the predetermined day cycle. Thus the exchanger will be more flattened to face the early morning and late evening sun and will be tilted more upwardly toward the noon sun with infinite increments therebetween. The reflector panels 37 aid further in capturing additional rays and thus energy from the solar body to convert the same into heat energy.

If the day is extremely cloudy or upon the setting of the sun in the evening, the temperature within lines 27 will drop to the point where thermostat 65 of exchanger 11 will break thus cutting off circulation pump 64. Since this pump is low energy consuming, the fact that it operates constantly when circulation temperatures are being achieved does not make the system of the present invention uneconomical. To the contrary, the amount of current used for any of the circulation modes described herein is negligble.

Whenever it is deemed desirable to use the energy stored in stoage means 12, such as heating enclosure 13, the thermostat 71 therein is set to the desired temperature. Whenever the temperature drops below this preset point, circulation pump 70 is activated to circulate fluid from heat storage means 12, through the interior heat exchangers 73, and back to the storge means. When the interior temperature has reached the desired preset level, thermostat 71 will break thus cutting off operation of pump 70.

As earlier discussed, valve 75 can be opened to either preheat the water going into the water heater 76 or to actually prevent any energy being expended by the normal heating elements thereof if the temperature of the stored liquid (if the same is water) is equal to or greater than that at which such heater is set.

As to the efficiency of the system of the present invention, a two panel heat exchange unit has been found to raise the temperature in a 250 gallon tank 40° on an average winter day. A three panel heat exchange unit is capable of furnishing, on an average winter day with only rare supplementation, all of the heat required for a 750 square foot, two bedroom apartment.

Although the system of the present invention has been described as capturing, storing and using of solar generated heat, it has been found that the heat exchanger in darkened conditions such as nighttime will actually absorb coolness to a point some ten degrees colder than the ambient air. On at least one occasion when water was being used as the fluid in the system, the same froze when the ambient temperature was many degrees above freezing. Because of this phenomena, switching valves 77 in inlet and outlet lines 35 and 36 can be used at night to circulate the cooled fluid into a cool storage means (not shown), identical in function to storage means or tank 12, for cooling rather than heating. The controlling thermostats 65 and 71 would have to be reversed, the former making on the drop while the latter making on the rise. In summer, or in climates with cool nights and warm days, the heat exchanger 11 with dual thermostats and automatic switching valves can be used for both warmth and cool energy absorption and storage for ultimate use within either enclosure 13 or any other desired application.

In the cooling concept hereinabove discussed, the heat exchanger would, of course, not need to be rotated or tilted and in fact if only cooling were desired, the heat exchanger could be fixedly installed rather than as hereinabove described.

Although the solar heat exchanger is shown and described as including a plurality of relatively flat ridges and valleys, it is understood, of course, that corrugated absorbing surfaces or even outwardly facing, semi-cylindrical surfaces can be used with the heat exchange tubes 27 disposed longitudinally in the troughs thereof. Also a heat resistant material such as asbestos can be placed between the absorbing surfaces 27 (whether flat as shown, corrugated or semi-cylindrical) and insulation 19.

From the above, it is obvious that the present invention has the advantage of providing a relatively simple and inexpensive and yet highly efficient solar energy operated heating system. It also, when not in use as a solar system, can be converted to use a cool temperature collecting and storing means.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced herein.

What is claimed is:

1. In a solar heating system including operatively connected solar energy heat exchanger means, heat storage means, and use heat exchanger means, the improvement comprising: a solar heat exchanger support base; a shaft rotatively mounted on said base; said solar energy heat exchanger means mounted on said shaft; a drive means operatively connected to said shaft; control means operatively connected to said drive means for progressively rotatively driving said shaft and a tilt support means toggly connected to said solar heat exchanger at one end and to a fixed point off center from the rotative axis of said shaft at the other end whereby said panel, when rotated to follow the movement of the sun, will automatically tilt to follow the up and down movement of said sun.

2. The system of claim 1 wherein the control means for progressively rotatingly driving said shaft is a programmable timer switch.

3. The system of claim 2 wherein said drive means is automatically recycleable at the end of each day by said timer switch.

4. The system of claim 1 wherein said solar energy heat exchanger means includes at least one solar heat exchange panel having a plurality of elongated, relatively flat surfaces formed into a plurality of ridges and valleys in a zig-zag pattern when viewed in cross section; and a continuous fluid heat transfer medium carrying heat exchange conduit alternatively disposed adjacent said ridges and valleys whereby an optimum amount of heat can be transferred from said surfaces to said transfer medium.

5. The system of claim 4 wherein said surfaces and tubes are of a dark, nonreflective color.

6. The system of claim 5 wherein said color is flat black.

7. The system of claim 5 wherein reflector panels are disposed on at least two sides of said solar heat exchanger.

8. The system of claim 7 wherein said reflector panels are disposed at approximately 110° from the solar exposed surface of said solar heat exchanger.

* * * * *